United States Patent [19]
Lattime et al.

[11] Patent Number: 6,162,848
[45] Date of Patent: Dec. 19, 2000

[54] CARPET LATEX COMPOUND

[75] Inventors: Richard Russell Lattime; Jaclyn Beth Laurich, both of Tallmadge, Ohio; George Robert Handley, Calhoun, Ga.

[73] Assignee: Omnova Solutions Inc., Fairlawn, Ohio

[21] Appl. No.: 09/032,667

[22] Filed: Feb. 27, 1998

Related U.S. Application Data

[60] Provisional application No. 60/042,046, Mar. 14, 1997.

[51] Int. Cl.$^7$ .................................................... C08L 93/04
[52] U.S. Cl. ............................................................ 524/272
[58] Field of Search .............................................. 524/272

[56] References Cited

U.S. PATENT DOCUMENTS

| | | |
|---|---|---|
| 4,189,419 | 2/1980 | Takemoto et al. . |
| 4,297,260 | 10/1981 | Ferree .................................... 260/29.7 |
| 5,385,965 | 1/1995 | Bernard .................................... 524/272 |
| 5,455,293 | 10/1995 | Wood ....................................... 524/271 |
| 5,525,655 | 6/1996 | Brockington ............................ 524/274 |
| 5,721,302 | 2/1998 | Wood ....................................... 524/271 |
| 5,747,579 | 5/1998 | Blakeman ................................ 524/562 |

*Primary Examiner*—Paul R. Michl
*Attorney, Agent, or Firm*—Robert F. Rywalski; Daniel J. Hudak

[57] ABSTRACT

This invention relates to a carboxylated styrene-butadiene latex for utilization in bonding carpet piles to carpet backing. By utilizing this improved latex, it is possible to attain improved wet-adhesion, a stronger tuft bind and improved delamination resistance. These improved properties are attained by including a rosin acid soap in the carboxylated styrene-butadiene latex. This invention more specifically discloses a carpet latex compound which is comprised of (a) a carboxylated styrene-butadiene latex, (b) a filler, (c) a thickener and (d) optionally, a curative; wherein said carboxylated styrene-butadiene latex is comprised of (i) water, (ii) a carboxylated styrene-butadiene rubber, (iii) an emulsifier and (iv) a rosin acid soap. The subject invention further discloses a process for manufacturing carpet which comprises the steps of (1) coating one side of a backing with a carpet latex compound to produce a latex-coated backing, wherein the carpet latex compound is comprised of (a) a carboxylated styrene-butadiene latex, (b) a filler, (c) a thickener and (d) optionally, a curative, and wherein said carboxylated styrene-butadiene latex is comprised of (i) water, (ii) a carboxylated styrene-butadiene rubber, (iii) an emulsifier and (iv) a rosin acid soap; (2) bringing a pile into contact with the coated side of the latex-coated backing and (3) allowing the carpet latex compound to dry while keeping the pile in contact with the coated side of the latex-coated backing to produce the carpet.

13 Claims, No Drawings

CARPET LATEX COMPOUND

This application claims the benefit of U.S. Provisional application Ser. No. 60/042,046 filed Mar. 14, 1997.

BACKGROUND OF THE INVENTION

In the manufacturing of carpets in general and tufted carpets in particular, one of the most important criteria of quality is the ability of the carpet construction to resist individual pile filaments from being pulled from the primary backing. This property is sometimes described as tuft-pull or tuft bind. Higher tuft-pull values are, of course, indicative of more desirable carpet construction.

Another major problem with carpet durability is the tendency of the pile to separate from the backing which exposes individual tufts. A measure of this characteristic is described as delamination strength. It is, again, desirable for this characteristic to be as high of a value as possible.

The most widely used method for laminating carpet pile to carpet backing involves the application of a carpet latex formulation to the surfaces of the backing and/or the piles being bonded together. It should be noted that the pile is normally mechanically bound to a primary backing to form a pile composite which is referred to herein as simply the pile. The coated innerface of the two surfaces (the pile composite and the carpet backing) are brought together and the whole composite including the pile portion of the construction is normally sent through large ovens. The heat treatment in the ovens serves the dual purpose of driving off the water contained in the latex compound and simultaneously curing the latex to effect a lamination of the pile to the backing. Upon exiting from the ovens, the finished carpet composite is cooled and taken up on large storage rolls.

It is naturally critical for the pile to adhere to the backing throughout the entire process. The adhesion of the pile to the backing while the carpet latex formulation is still wet is referred to as "wet adhesion" and is sometimes known by those involved in the carpet manufacturing industry as "quick-grab." There has been a long felt need in the carpet manufacturing industry for carpet latex formulations which exhibit improved wet adhesion characteristics.

SUMMARY OF THE INVENTION

The utilization of the carpet latex formulations of this invention in making carpet results in greatly improved wet adhesion characteristics during the manufacturing process. This reduces the amount of carpet which must be scrapped during the manufacturing process. In other words, it reduces the incidence of cases where the carpet is ruined because there is insufficient wet adhesion to keep the pile in adequate contact with the backings until the latex composition is dry. By utilizing the latex compounds of this invention in manufacturing carpet, costs can accordingly be greatly reduced.

Employment of the carpet latex formulations of this invention in making carpet also results in improved tuft bind and delamination strength. These characteristics are also highly desirable. Thus, the utilization of the carpet latex compounds of this invention results in improved carpet as well as an improved carpet manufacturing process.

The present invention more specifically discloses a carpet latex compound which is comprised of (a) a carboxylated styrene-butadiene latex, (b) a filler and (c) a thickener; wherein said carboxylated styrene-butadiene latex is comprised of (i) water, (ii) a carboxylated styrene-butadiene rubber, (iii) an emulsifier and (iv) a rosin acid soap.

The subject invention further reveals a process for manufacturing carpet which comprises the steps of (1) coating one side of a backing with a carpet latex compound to produce a latex-coated backing, wherein the carpet latex compound is comprised of (a) a carboxylated styrene-butadiene latex, (b) a filler and (c) a thickener and wherein said carboxylated styrene-butadiene latex is comprised of (i) water, (ii) a carboxylated styrene-butadiene rubber, (iii) an emulsifier and (iv) a rosin acid soap; (2) bringing a pile into contact with the coated side of the latex coated backing, (3) allowing the carpet latex compound to dry while keeping the pile in contact with the coated side of the latex-coated backing to produce the is carpet.

The present invention also discloses a carpet which is comprised of a backing and a pile which is bonded to said backing with an admixture of a carboxylated styrene-butadiene rubber, a rosin acid soap and a filler.

DETAILED DESCRIPTION OF THE INVENTION

The textile backing utilized in manufacturing carpet, particularly tufted carpets, is a loosely woven fabric of natural or synthetic fibrous materials, such as jute or polypropylene. The pile is normally manufactured with a tufting machine wherein the individual fiber filaments are pulled or punched through the interstices of a textile layer such that a portion of the individual filaments extend below the plane of the first textile layer. These portions of the individual filaments or tufts must be locked or bonded into position so that the tufts do not pull out during the service life of the carpet. The backing is superposed over substantially all of the pile with the carpet latex composition interposed between the two layers. The general purpose of the backing is to protect the exposed ends of the tufts and also to add additional dimensional stability to the finished carpet structure.

The carpet latex compound of this invention is comprised of (a) a carboxylated styrene-butadiene latex, (b) a filler and (c) a thickener wherein the carboxylated styrene-butadiene latex is comprised of (i) water, (ii) a carboxylated styrene-butadiene rubber, (iii) an emulsifier and (iv) a rosin acid soap. Such carpet latex compounds are typically made by adding a rosin acid soap to a conventional carboxylated styrene-butadiene latex and subsequently adding the filler, the thickener and optionally a curative thereto. The conventional carboxylated styrene-butadiene latices which can be used are commercially available from a variety of sources. The carboxylated styrene-butadiene rubber in these latices will typically be comprised of repeat units which are derived from styrene, 1,3-butadiene and an unsaturated carboxylic acid. The carboxylated styrene-butadiene polymer will normally contain repeat units which are derived from about 45 weight percent to about 74.5 weight percent styrene, from about 25 weight percent to about 50 weight percent 1,3-butadiene, and from about 0.5 weight percent to about 5 weight percent of an unsaturated carboxylic acid. The carboxylated styrene-butadiene polymer will preferably contain repeat units which are derived from about 52 weight percent to about 69.5 weight percent styrene, from about 30 weight percent to about 45 weight percent 1,3-butadiene, and from about 1 weight percent to about 3 weight percent of an unsaturated carboxylic acid. The carboxylated styrene-butadiene polymer will most preferably contain repeat units which are derived from about 58 weight percent to about 63.4 weight percent styrene, from about 35 weight percent to about 40 weight percent 1,3-butadiene, and from about 1.6 weight percent to about 2 weight percent of an unsaturated carboxylic acid.

The unsaturated carboxylic acids which can be utilized will normally contain vinyl unsaturation and at least one carboxyl group. Some representative examples of unsaturated carboxylic acids which can be used include acrylic acid, methacrylic acid, fumaric acid and itaconic acid.

The carboxylated styrene-butadiene rubber latex will also, of course, contain water and an emulsifier in addition to the carboxylated styrene-butadiene rubber. Such latices will normally have a solids content which is within the range of about 45 percent to about 60 percent. The carboxylated styrene-butadiene latex will preferably have a solids content which is within the range of about 48 percent to about 55 percent and will most preferably have a solids content which is within the range of about 50 percent to about 52 percent.

The carboxylated styrene-butadiene latex is normally prepared by free radical emulsion polymerization. The charge compositions used in the preparation of such latices contain the monomers, at least one surfactant, and at least one free radical initiator. The monomer charge composition used in such polymerizations is, of course, comprised of (a) styrene monomer, (b) 1,3-butadiene monomer and (c) an unsaturated carboxylic acid monomer.

The charge composition used in the preparation of the latex will contain a substantial quantity of water. The ratio between the total amount of monomers present in the charge composition and water can range between about 0.2:1 and about 1.2:1. It is generally preferred for the ratio of monomers to water in the charge composition to be within the range of about 0.8:1 and about 1.1:1. For instance, it is very satisfactory to utilize a ratio of monomers to water in the charge composition of about 1:1.

The charge composition will also contain from about 0.2 phm (parts per hundred parts of monomer) to about 6 phm of at least one emulsifier. It is normally preferred for the emulsifier (surfactant) to be present in the polymerization medium at a level within the range of about 1 phm to about 5 phm. It is generally more preferred for the charge composition to contain from about 2 phm to about 4 phm of the emulsifier.

The emulsifiers used in the polymerization can be charged at the outset of the polymerization or may be added incrementally or by proportioning as the reaction proceeds. Generally, anionic emulsifier systems provide good results; however, any of the general types of anionic, cationic or nonionic emulsifiers may be employed in the polymerization.

Among the anionic emulsifiers that can be employed in emulsion polymerizations include napthenic acids and their soaps and the like; sulfuric esters and their salts, such as the tallow alcohol sulfates, coconut alcohol sulfates, fatty alcohol sulfates, such as oleyl sulfate, sodium lauryl sulfate and the like; sterol sulfates; sulfates of alkylcyclohexanols, sulfation products of lower polymers of ethylene as $C_{10}$ to $C_{20}$ straight chain olefins and other hydrocarbon mixtures, sulfuric esters of aliphatic and aromatic alcohols having intermediate linkages, such as ether, ester or amide groups such as alkylbenzyl (polyethyleneoxy) alcohols, the sodium salt of tridecyl ether sulfate; alkane sulfonates, esters and salts, such as alkylchlorosulfonates with the general formula $RSO_2Cl$, wherein R is an alkyl group having from 10 to 20 carbon atoms and alkylsulfonates with the general formula $RSO_2$—OH, wherein R is an alkyl group having from 1 to 20 carbon atoms; sulfonates with intermediate linkages such as ester and ester-linked sulfonates such as those having the formula $RCOOC_2H_4SO_3H$ and $ROOC$—$CH_2$—$SO_3H$, wherein R is an alkyl group having from 1 to 20 carbon atoms such as dialkyl sulfosuccinates; ester salts with the general formula:

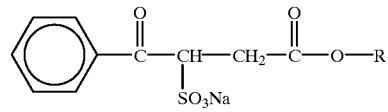

wherein R is an alkyl group having from 1 to 20 carbon atoms; alkaryl sulfonates in which the alkyl groups contain preferably from 10 to 20 carbon atoms, e.g. dodecylbenzenesulfonates, such as sodium dodecylbenzenesulfonates; alkyl phenol sulfonates; sulfonic acids and their salts such as acids with the formula $RSO_3Na$, wherein R is an alkyl and the like; sulfonamides; sulfamido methylenesulfonic acids; rosin acids and their soaps; sulfonates derivatives of rosin and rosin oil; and lignin sulfonates and the like.

The polymerization can be initiated using free radical generators, ultraviolet light or radiation. To ensure a satisfactory polymerization rate, uniformity and a controllable polymerization, free radical initiators are generally used. The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide and the like; the various azo compounds such as 2-t-butylazo-2-cyanopropane, dimethyl azodiisobutyrate, azodiisobutylronitrile, 2-t-butylazo-1-cyanocyclohexane, 1-t-amylazo-1-cyanocyclohexane and the like, the various alkyl perketals, such as 2,2-bis-(t-butyl-peroxy)butane and the like. Water-soluble peroxygen-free radical initiators and redox systems are especially useful in such aqueous polymerizations.

The emulsion polymerization utilized in synthesizing the latices of this invention can be carried out over a broad temperature range from about 0° C. to as high as about 100° C. It is normally preferred for the emulsion polymerization to be carried out at a temperature which is within the range of about 20° C. to about 90° C. It is generally more preferred for the emulsion polymerization to be conducted at a temperature which is within the range of about 35° C. to about 85° C.

After the desired degree of monomer conversion has been attained, a conventional shortstopping agent, such as hydroquinone, can be added to the polymerization medium to end the polymerization. The polymerization will typically be allowed to continue until a high level conversion has been achieved. In most cases, the monomer conversion reached will be at least about 80 percent with monomer conversions of at least about 90 percent being preferred.

After the polymerization has optionally been shortstopped, it is generally desirable to neutralize the latex to a pH which is within the range of 6 to 8 and subsequently to strip unreacted monomers from the emulsion. This can be accomplished using conventional techniques such as the addition of a strong base, such as sodium hydroxide or ammonium hydroxide followed by steam-stripping. After any stripping operations have been completed, the antioxidant can be added to the carboxylated styrene-butadiene rubber containing emulsion to produce a stabilized latex.

Virtually any type of antioxidant can be utilized for this purpose. For instance, any antioxidant can be used which is capable of rendering the polymer less susceptible to oxidative attack by chemically interrupting the autoxidation process by which the polymer is oxidatively degraded. More specifically, the antioxidant can be a chain-breaking antioxidant, a peroxide-decomposing antioxidant, an ultraviolet screening agent, a triplet quencher or a metal deactivator.

A convenient time to add the rosin acid soap to the latex is after the polymerization has been terminated and the latex has optionally been stripped of unreacted monomers. A sufficient amount of rosin acid soap will be added to attain a level of about 0.05 phr to about 10 phr in the latex. The term "phr" stands for "parts per 100 parts of rubber" and is based upon the dry weight of the carboxylated styrene-butadiene rubber in the latex. The carboxylated styrene-butadiene latex will typically contain from about 0.1 phr to 5 phr of the rosin acid soap. It is normally preferred for the carboxylated styrene-butadiene latex to contain from about 0.25 phr to about 2 phr of the rosin acid soap with it being most preferred for the carboxylated styrene-butadiene latex to contain from about 0.5 phr to about 1 phr of the rosin acid soap. The rosin acid soap will normally be a potassium, sodium or lithium soap with the potassium soap being most preferred.

After the rosin acid soap has been added to the carboxylated styrene-butadiene latex, the carpet latex compounds of this invention can be made by conventional techniques utilizing said latex. Such carpet latex compounds can be made by simply mixing the desired fillers, thickeners and optionally curatives into the carboxylated styrene-butadiene latex. The carpet latex compound will also typically contain a froth aid and will often further include antimony and/or starch. It should be noted that the rosin acid soap added to the latex acts as a froth aid. Thus, the need to add additional froth aids can be reduced or even eliminated. The filler employed will typically be an inorganic carbonate, hydrated alumina and/or clay. The thickener will commonly be an alkyl polyacrylic acid.

The carpet latex compound will typically contain from about 250 parts by weight to about 800 parts by weight of filler, from about 0.1 parts by weight to about 5 parts by weight of thickener, from 0 parts by weight to about 5 parts by weight of froth aid, and from about 0 to about 10 parts by weight of zinc oxide per 100 parts by weight of latex. The carpet latex compound will preferably contain from about 300 parts by weight to about 600 parts by weight of filler, from about 0.15 parts by weight to about 3 parts by weight of thickener, from 0.1 parts by weight to about 3 parts by weight of froth aid, and optionally from about 1 to about 4 parts by weight of zinc oxide per 100 parts by weight of latex. The carpet latex compound will more preferably contain from about 400 parts by weight to about 450 parts by weight of filler, from about 0.15 parts by weight to about 1.5 parts by weight of thickener, from 0.2 parts by weight to about 1 parts by weight of froth aid, and optionally from about 2 to about 3 parts by weight of zinc oxide per 100 parts by weight of latex.

The carpet latex compound of this invention can then be employed in manufacturing carpet. This will typically involve coating one side of a carpet backing with the carpet latex compound to produce a latex-coated backing. It is also, of course, possible to apply the carpet latex compound directly to the pile or to apply it to both the backing and the pile. The pile is then brought into contact with the coated side of the latex-coated backing. Then the carpet latex compound is allowed to dry while keeping the pile in contact with the coated side of the latex-coated backing. This is normally done by passing the carpet through a drying oven or a series of drying ovens. During this drying process, the carpet latex compounds of this invention offer greatly improved wet adhesion characteristics. After substantially all of the water has evaporated from the carpet latex compound, the carpet manufacturing process is completed. The finished carpet produced by this technique offers improved tuft-bind and delamination strength.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE

In this experiment, carpet was manufactured utilizing the carpet latex compound of this invention. In the procedure utilized, 4 phr of the potassium soap of rosin acid was added to a carboxylated styrene-butadiene latex. The latex had a solids content of about 50 to 52 percent and the carboxylated styrene-butadiene rubber therein contained about 58.2 weight percent styrene, about 40 weight percent 1,3-butadiene and about 1.8 weight percent itaconic acid. A carpet latex compound was then made by mixing about 425 parts of weight of calcium carbonate, about 1 parts by weight of a thickener, about 0.5 parts by weight of a froth aid, and about 2 parts by weight of zinc oxide into the latex.

Carpet was then made utilizing the carpet latex compound to adhere the pile to the carpet backing. During the drying process, the wet carpet latex compound provided excellent wet-adhesion. The finished carpet was also evaluated to determine its tuft bind and delamination strength and compared to a control carpet which was made utilizing an identical latex except for the absence of the rosin acid soap.

Tuft bind was determined by measuring the force required to pull the carpet piles from the backing as measured or an Instron tensile testing machine. Delamination strength was measured by determining the force required to separate the pile from the backing as measured on a test strip which was 3 inches (7.62 cm) wide. The carpet of this invention exhibited an average tuft bind of 7.88 pounds per square inch ($6.07 \times 10^4$ Pascals). This is about 30 percent greater than the average tuft bind of 6.05 pounds per square inch ($4.17 \times 10^4$ Pascals) exhibited by the control carpet. These tuft bind values are the average of 15 samples.

The carpet of this invention exhibited an average delamination strength of 4.53 pounds per square inch ($3.12 \times 10^4$ Pascals). This is about 64 percent greater than the average delamination strength of 2.76 pounds per square inch ($1.90 \times 10^4$ Pascals) exhibited by the control carpet. These delamination strengths are the average of 25 samples.

This example shows that the carpet latex compounds of this invention can be employed to improve carpet manufacturing processes by increasing wet-adhesion characteristics. It also shows that higher quality carpet which exhibits greatly improved tuft bind and delamination strength results. The utilization of the rosin acid soap containing carpet latex compounds of this invention has also proven to significantly reduce dusting during carpet roll-up which is typically experienced with "stiff hand" carpet.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A carpet latex compound for bonding carpet pile to a backing which is comprised of (a) a carboxylated styrene-butadiene latex, (b) a filler present in an amount from about 250 parts by weight to about 800 parts by weight per 100 parts by weight of said latex and (c) a thickener present an an amount from about 0.1 parts by weight to about 5 parts by weight per 100 parts by weight of said latex; wherein said carboxylated styrene-butadiene latex is comprised of (i) water, (ii) a carboxylated styrene-butadiene rubber, (iii) an emulsifier in an amount from about 0.2 phr to about 6 phr, and (iv) a rosin acid soap in an amount from about 0.05 phr to about 10 phr.

2. A carpet latex compound as specified in claim 1, wherein said rosin acid soap is a potassium soap of rosin acid, a sodium soap of rosin acid, or a lithium soap of rosin acid.

3. A carpet latex compound as specified in claim 1 wherein said rosin acid soap is a potassium soap of rosin acid.

4. A carpet latex compound as specified in claim 3 including a zinc oxide curative.

5. A carpet latex compound as specified in claim 4 wherein said rosin acid soap is present at a level which is within the range of about 0.1 phr to about 5 phr.

6. A carpet latex compound as specified in claim 5 wherein said filler is calcium carbonate.

7. A carpet latex compound as specified in claim 6 wherein said rosin acid soap is present at a level which is within the range of about 0.25 phr to about 2 phr.

8. A carpet latex compound as specified in claim 7 wherein said carboxylated styrene-butadiene rubber is comprised of repeat units which are derived from about 52 weight percent to about 69.5 weight percent styrene, from about 30 weight percent to about 45 weight percent 1,3-butadiene, and from about 1 weight percent to about 3 weight percent itaconic acid.

9. A carpet latex compound as specified in claim 7 wherein said carboxylated styrene-butadiene rubber is comprised of repeat units which are derived from about 58 weight percent to about 63.4 weight percent styrene, from about 35 weight percent to about 40 weight percent 1,3-butadiene, and from about 1.6 weight percent to about 2 weight percent itaconic acid.

10. A carpet latex compound as specified in claim 9 wherein said rosin acid soap is present at a level which is within the range of about 0.5 phr to about 1 phr.

11. A carpet latex composition as specified in claim 1 wherein said carboxylated styrene-butadiene rubber contains repeat units which are derived from about 45 weight percent to about 74.5 weight percent styrene, from about 25 weight percent to about 50 weight percent 1,3-butadiene, and from about 0.5 weight percent to about 5 weight percent itaconic acid.

12. A carpet latex as specified in claim 1 wherein said carpet latex composition can be employed to improve tuft bind and delamination strength.

13. A carpet latex compound as specified in claim 7 wherein said carboxylated styrene-butadiene rubber is comprised of repeat units which are derived from about 52 weight percent to about 69.5 weight percent styrene, from about 30 weight percent to about 45 weight percent 1,3-butadiene and from about 1 weight percent to about 3 weight percent unsaturated carboxylic acid monomers selected from the group consisting of acrylic acid, methacrylic acid, fumaric acid and itaconic acid.

* * * * *